(12) United States Patent
White et al.

(10) Patent No.: US 10,088,067 B2
(45) Date of Patent: Oct. 2, 2018

(54) REMOTELY CONTROLLED VALVE

(71) Applicant: Oasis Testing, LLC, Conroe, TX (US)

(72) Inventors: Demetri M. White, Conroe, TX (US);
Michael W. Martin, Conroe, TX (US);
Donald S. Divelbiss, Howard, OH (US)

(73) Assignee: Oasis Testing, LLC, Conroe, TX (US)

( * ) Notice: Subject to any disclaimer, the term of this patent is extended or adjusted under 35 U.S.C. 154(b) by 274 days.

(21) Appl. No.: 14/733,918

(22) Filed: Jun. 8, 2015

(65) Prior Publication Data
US 2015/0268653 A1    Sep. 24, 2015

(51) Int. Cl.
*F16K 31/04* (2006.01)

(52) U.S. Cl.
CPC ..................... *F16K 31/04* (2013.01)

(58) Field of Classification Search
CPC ....................................... F16K 31/04
See application file for complete search history.

(56) References Cited

U.S. PATENT DOCUMENTS

| | | | |
|---|---|---|---|
| 4,760,547 A * | 7/1988 | Duxbury | A01G 25/16 239/69 |
| 5,083,744 A * | 1/1992 | Oliver | F16K 31/041 137/554 |
| 5,173,855 A * | 12/1992 | Nielsen | A01G 25/16 239/69 |
| 5,422,808 A * | 6/1995 | Catanese, Jr. | G05B 19/4063 307/132 E |
| 5,488,275 A | 1/1996 | Tice | |
| 5,588,636 A * | 12/1996 | Eichholz | G05D 23/1393 251/129.04 |
| 6,019,126 A * | 2/2000 | Kelada | F16K 37/0091 137/554 |
| 6,662,821 B2 * | 12/2003 | Jacobsen | F16K 31/05 137/557 |
| 6,921,244 B2 * | 7/2005 | Johnson | F01D 17/08 415/144 |
| 7,559,529 B2 | 7/2009 | Affaticati | |
| 7,775,504 B2 | 8/2010 | Patient | |
| 7,821,220 B2 * | 10/2010 | El-Ibiary | H02P 5/00 318/538 |
| 2004/0004200 A1 * | 1/2004 | Pescatore | F16K 31/04 251/129.04 |
| 2011/0267137 A1 | 3/2011 | Brand | |
| 2011/0208804 A1 | 8/2011 | Kuzhiyil | |
| 2012/0047185 A1 | 2/2012 | Driesen | |
| 2012/0151273 A1 | 6/2012 | Brand | |

* cited by examiner

*Primary Examiner* — Eric Keasel
(74) *Attorney, Agent, or Firm* — Tumey L.L.P.

(57) ABSTRACT

A remotely controlled valve includes an electric motor and transmission for moving a valve stem or valve actuator. The operation of the motor may be controlled by a first input for power and analog signals. The valve is also provided with a programmable logic controller and a wireless module for receiving wireless control signals for controlling the operation of the motor which moves the valve stem or a valve actuator in a desired manner.

3 Claims, 1 Drawing Sheet

REMOTELY CONTROLLED VALVE

BACKGROUND OF THE INVENTION

1. Field of the Invention

This application is directed to a remotely actuated valve. Valves of this type are frequently used in pressure fluid systems where it is desired to bleed off a small but precise amount of fluid as part of testing procedures.

2. Description of Related Art

Valves currently available in testing environments are typically operated manually or actuated remotely via an analog control cable. Analog signals are used to control a motor which is connected to a valve stem via a transmission that reduces the high speed of the motor.

Once the valves are installed in a system, the actuating system for the valves is limited to the particular type of control system then in place. Should a newer more accurate control system utilizing for example a wireless signal to control a valve be desired, it would require that the valve be replaced and updated to accommodate the new control system.

It would be extremely useful to design a valve that is compatible with multiple types of control systems in order to reduce the cost and time necessary to update the valve for use with the new control system.

BRIEF SUMMARY OF INVENTION

The present invention is directed to a remotely controlled valve. The valve includes an electric motor and transmission for actuating a valve stem for precise control of the valve. The electronic control module for the motor may be controlled by a variety of methods including wireless technologies, digital signal (Ethernet—TCP/IP), serial communication (i.e. MODBUS), and traditional wired analog cables.

Figure 1:
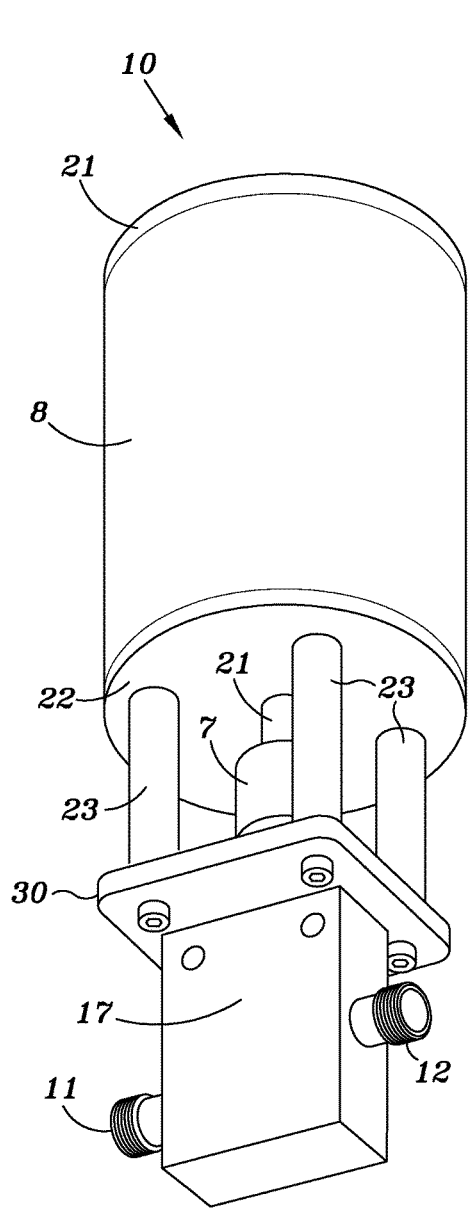
FIG. 1 is a perspective view of a valve according to an embodiment of the invention.
Figure 2:
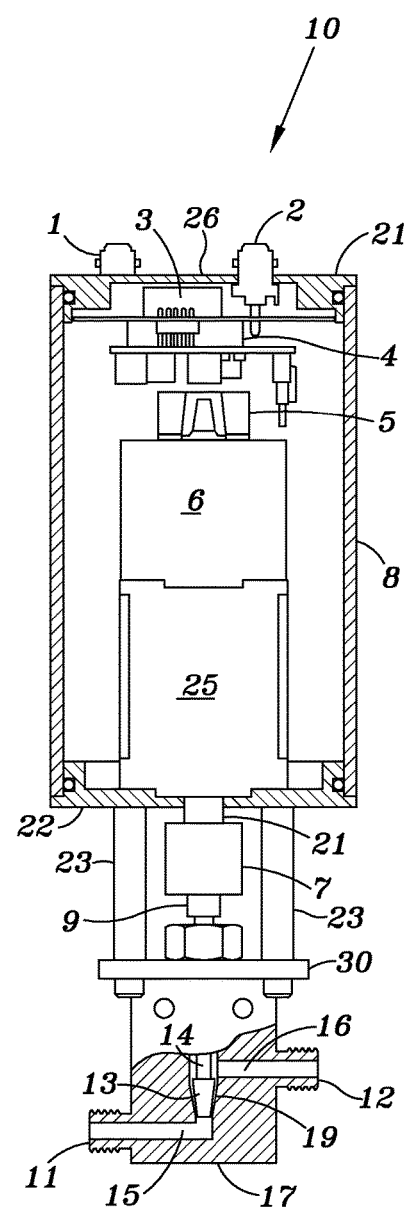
FIG. 2 is a partial sectional view of the embodiment of FIG. 1.

An embodiment of the valve 10 of the present invention is shown in FIG. 1 and includes a cylindrical housing 10 having a top cover plate 21 and a bottom cover plate 22. Housing 10 contains the control module, electric motor and transmission for moving the valve stem 14 all of which is shown in FIG. 2. The valve 10 also includes a valve body 17 which is attached to the bottom cover plate 22 by a plurality of studs 23.

The transmission includes an output shaft 21 which is connected to the valve stem 14 via a coupler 7 and 9 which causes the valve stem 14 to reciprocate to thereby cause the valve to be opened or closed.

As shown in FIG. 2, the internal components of the valve include a motor 6 and a transmission 25 coupled to the motor. Transmission 25 includes an output shaft 21. A coupler 7 couples the output shaft of the transmission to spline 9 which is also coupled to the valve stem 14.

A similar arrangement for raising and lowering a valve stem is shown in U.S. Pat. No. 5,488,275 the entire contents of which is hereby incorporated by reference thereto.

Power for the electric motor and an analog control signal are supplied to the valve via input connector 1. A second electrical connector 2 is provided for digital signal inputs such as an Ethernet or Modbus connection. The valve also includes a conventional programmable logic controller module 4 having a receptor section which may receive a module control such as WIFI, Bluetooth, RF or other wireless modules. The programmable logic controller module 4 may also be preprogrammed with wireless protocols, such as CAN and SERIAL BUSSES (RS232/RS485). In this manner a valve according to an embodiment of the invention may be preset to be controlled by a traditional analog signal, a wired digital signal, or a wireless signal.

The valve also includes a valve body having a fluid inlet 11, a fluid outlet 12, and internal passage 15, 16. A valve stem 14 or actuator terminates in a needle like valve element 13 which cooperates with a valve seat 19 in a known manner. Other types of valves such as balls valves, rotary valves, and butterfly valves, or the like may also be controlled as long as it is rotary in nature. In this event, element 14 can be adapted to cause rotation of the rotary valve member in a known fashion.

A position sensor 5 provided on the top of the motor 6.

The top 21 of the valve housing may be provided with a thinner portion 26 or plastic insert to facilitate reception of wireless module 3.

Initially the valve may be configured to be actuated by a particular wireless technology for example Bluetooth by installing a BLUETOOTH wireless protocol module on the programmable logic controller 4. The valve may be easily modified to function in another wireless environment such as WIFI simply by replacing the BLUETOOTH wireless protocol module 3 with a WIFI module.

Although the present invention and its advantages have been described in detail, it should be understood that various changes, substitutions and alterations may be made herein without departing from the spirit and scope of the invention as defined by the appended claims.

We claim:

1. A remotely controlled valve comprising:
   a.) a housing including a central section, a top portion and a bottom portion,
   b.) a motor and transmission positioned within the housing,
   c.) a valve body connected to the housing and including an inlet and outlet, and a valve actuator connected to the transmission,
   d.) a first power and analog signal input,
   e.) a programmable logic controller connected to the motor and controlling the operation of the motor,
   f.) a digital signal input connected to the programmable logic controller, and
   g.) a wireless module connected to the programmable logic controller for receiving wireless data to control the movement of the valve actuator, wherein the top portion of the housing includes a thinner section than that of another section of the top portion, the thinner section positioned directly above the wireless module.

2. A remotely controlled valve as claimed in claim 1 further including a position sensor that senses the position of a shaft of the motor.

3. A remotely controlled valve as claimed in claim 1 wherein the programmable logic controller is preprogrammed with wireless protocols.